United States Patent [19]

Dressel

[11] Patent Number: 4,862,637

[45] Date of Patent: Sep. 5, 1989

[54] BIRD REPELLING SYSTEM WITH IMPROVED MOUNTING FIXTURE

[76] Inventor: Lucian W. Dressel, 101 Webster, Augusta, Mo. 63332

[21] Appl. No.: 293,693

[22] Filed: Jan. 5, 1989

[51] Int. Cl.[4] .......................................... A01M 29/00
[52] U.S. Cl. ........................................ 43/98; 256/10; 361/232
[58] Field of Search ...................... 43/98, 112; 256/10; 361/232

[56] References Cited

U.S. PATENT DOCUMENTS

| | | | |
|---|---|---|---|
| 3,294,893 | 12/1966 | Shaffer | 361/232 |
| 3,366,854 | 1/1968 | Robinson | 43/98 |
| 4,015,176 | 3/1977 | Shanahan et al. | 43/99 |
| 4,299,048 | 11/1981 | Bayes | 43/98 |

FOREIGN PATENT DOCUMENTS 135179 1/1952 Sweden ................... 43/98

Primary Examiner—Nicholas P. Godici
Assistant Examiner—William Scott Andes
Attorney, Agent, or Firm—Polster, Polster & Lucchesi

[57] ABSTRACT

A vineyard has conductive trellis wires which extend between poles to provide support for the grape vines. At least some of the trellis wires are grounded. A number of identical bird repelling devices are widely spaced throughout the vineyard. Each has a length much shorter than the distance between adjacent vineyard poles, the length being sufficient to allow a bird to land. The bird repelling devices have a circumference less than approximately one and one-half inch to allow the feet of a bird landing thereon to cover most of its circumference. Each bird repelling device is composed of an elongate insulating member and an electrically conductive rod secured to it. The rod is substantially as long as the elongate insulating member. A high voltage is applied to each electrically conductive rod. Each of the elongate insulating members is secured to a portion of the trellis wires parallel to the trellis wires. A bird landing on a bird repelling device completes a circuit between the trellis wire and the electrically conductive rod carried by that bird repelling device. This shocks the bird without substantially harming it so that the bird flies away. Mounting fixtures mounted on vineyard poles at the ends of rows readily accept, hold, and automatically make electrical contact with modified bird repelling devices.

21 Claims, 3 Drawing Sheets

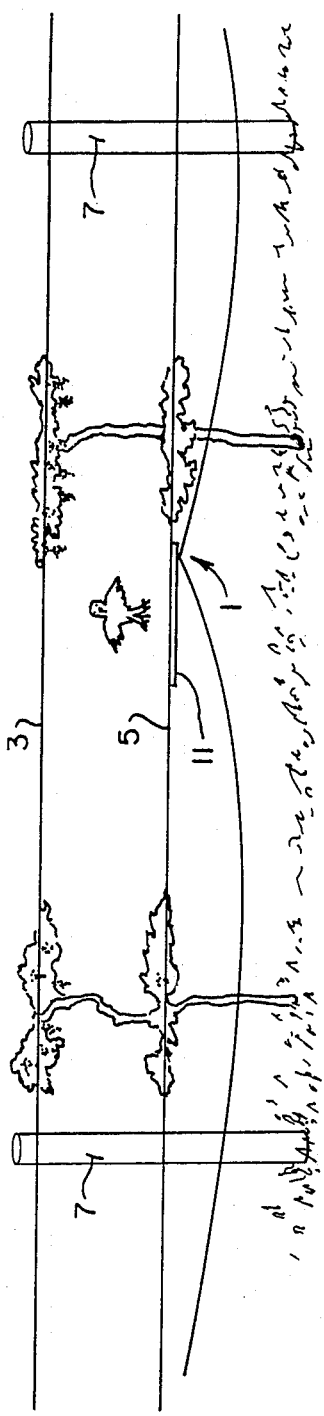
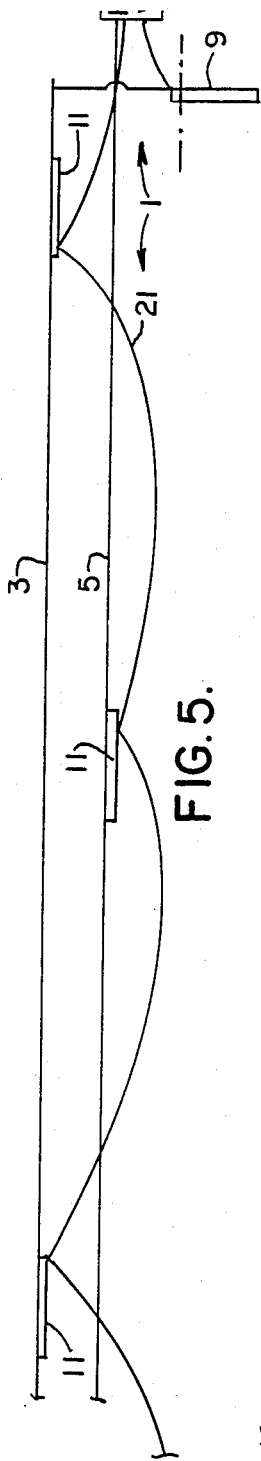
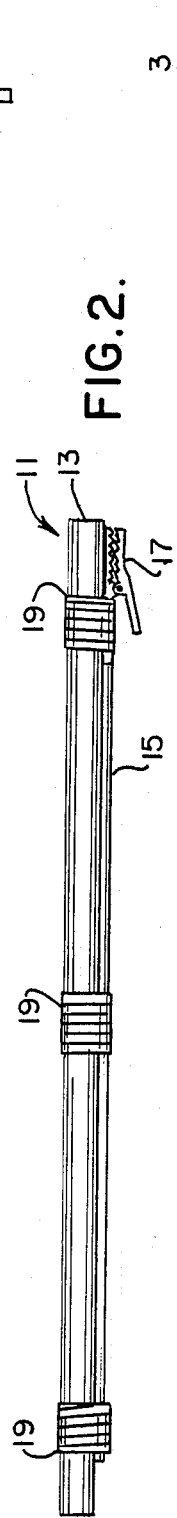
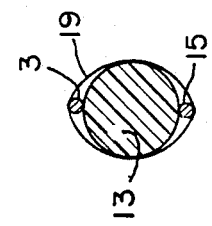
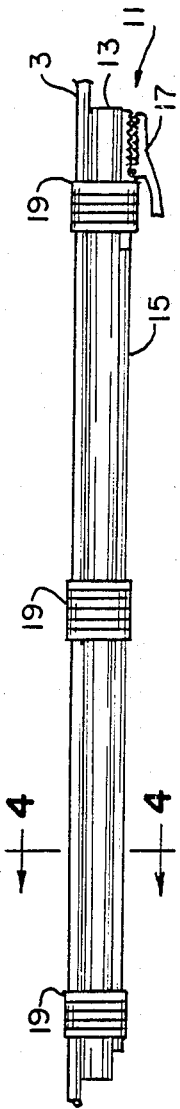
FIG.1.
FIG.2.
FIG.3.
FIG.4.
FIG.5.

BIRD REPELLING SYSTEM WITH IMPROVED MOUNTING FIXTURE

BACKGROUND OF THE INVENTION

This invention relates to bird repelling systems and, more particularly, to such systems particularly suited for vineyards.

Birds are a significant threat to vineyards. For example, a single flock of birds could spoil ten tons of fruit in a few days. Accordingly, many methods and systems have been designed to protect vineyards from the ravages of birds.

One method of protection, which is extremely effective, involves netting which is placed over the vines. The birds do not eat the fruit through the netting. A major drawback of netting, however, is the time it involves. It not only takes a great deal of time and manpower to cover the vineyard with netting, it also takes as much or more time to remove the netting when it is time to pick the grapes. Moreover, if left in place for any length of time, weeds grow up through the netting and the grape vines grow through it as well. This makes it doubly difficult to remove the netting when necessary. When removed, the netting often brings along trash and has many tears, both of which reduce the reusability of the netting.

There have been chemical sprays used in the past which repelled the birds, but with increasing concern about the use of chemicals on food products these sprays have become unacceptable. Another spray, made of natural ingredients such as garlic and red pepper, is still used, particularly for table grapes. But it also has drawbacks. When it rains, this mixture forms a residue on the grapes. Such a mixture is especially undesirable for wine grapes since it can result in getting garlic and red pepper in the wine.

There are more direct approaches taken to repelling birds from vineyards. Some vineyard owners have been known to shoot birds with shotguns, but this method is relatively inefficient and the effect of an assault on the birds is relatively short-lived.

Some other bird repelling systems involve various kinds of scarecrows or sound generating systems. For example, one such system generates screeches similar to those of birds in trouble. Such systems increase the anxiety level of the birds eating grapes in the vineyard, but do little to drive them off.

There have been general attempts to repel birds by using electrical shocks. Such systems are shown in U.S. Pat. Nos. 3,366,854 to Robinson, 4,015,176 to Shanahan et al., and 4,299,048 to Bayes.

In the Robinson patent, the bird repelling system is in the form of a cable with an insulative body separating two conductors. The conductors are generally held within the cable, but part of their surfaces are exposed so that when a bird lands on the cable it completes a circuit between the two conductors, receives a shock, and leaves. This system apparently teaches placing this two-conductor cable everywhere it is desired to repel the birds. Thus, for a relatively large area, a large amount of relatively expensive cable would be required. To improve its operation, the system of Robinson optionally includes the use of support posts (FIG. 5) to raise the two-conductor cable above the surface such as a ledge on which it would otherwise lie.

The Shanahan et al system is a general purpose bird repelling system for use in fruit orchards, vineyards, and window ledges. Shanahan teaches that when an outdoor area is to be protected, the arrangement shown in FIG. 4 thereof is to be used. Upright posts 41 are secured in the ground, and a perch or cable 42 is strung between the posts. The cable is a flexible cord of insulative material carrying two electric wires. The wires are charged from a battery 43. When birds alight on the cable, they receive a shock strong enough to chase them away, but not necessarily strong enough to stun them. The height of the posts may vary from a few inches to many feet, depending upon the height of the plants being protected.

The Bayes system involves a similar electrified cable with two conductors, one on each side. When enough birds land on the cable to make it worthwhile, they are all electrocuted at once.

All these electrical systems require an extensive amount of cable, the cable is not a standard item and hence is relatively expensive, and separate means for suspending the cable is required or suggested.

SUMMARY OF THE INVENTION

Among the several objects and features of the present invention may be noted the provision of an improved system which effectively protects vineyards from birds.

Another object is the provision of such a system which involves minimal set-up time.

A further object is the provision of such a system which need not be removed before the grapes are picked.

A fourth object is the provision of such a system which is reusable and does not suffer any loss in effectiveness with reuse.

A fifth object is the provision of such a system which does not contaminate the fruit in any way.

A sixth object is the provision of such a system which has a long-lasting effect upon the birds.

A seventh object is the provision of such a system which does not require special electrical cable or special supporting structure.

An eighth object is the provision of such a system which is relatively inexpensive, yet reliable.

Other objects and features will be in part apparent and in part pointed out hereinafter.

Briefly, the system of the present invention is directed to repelling birds from a vineyard which has trellis wires stretched generally horizontally between a plurality of poles. These trellis wires support the grape vines above the ground. The bird repelling system includes a ground rod, for grounding at least some of the trellis wires, and first and second sets of elongate insulating members. Each elongate insulating member has a length much shorter than the distance between adjacent vineyard poles, the length being sufficient to allow a bird to land thereon. Each elongate insulating member also has a circumference less than approximately one and one-half inches to allow the feet of a bird landing thereon to cover most of its circumference. Each elongate insulating member of the first set carries an electrically conductive rod secured thereto along the length thereof, which electrically conductive rod is substantially as long as the elongate insulating member. A high voltage source and connecting wiring are included for applying a high voltage to each electrically conductive rod. Each of the elongate insulating members of the first set is adapted to be secured to selected portions of the trellis wires parallel to the trellis wires. A bird landing on an elongate insulating member completes a circuit between the trellis wire and the electrically conductive rod carried by that elongate insulating member, which shocks the bird without substantially harming it so that the bird flies away. Each member of the second set fixedly carries a pair of electrically conductive rods on opposite sides thereof. A plurality of mounting fixtures are fixedly secured to predetermined vineyard poles. Each fixture is shaped to removably hold an elongate member of the second set in place and automatically make electrical connection with both conductive rods carried by the member.

In a second aspect of the present invention, a system for repelling birds from a vineyard includes a plurality of bird repelling devices for mounting to selected vineyard poles. The bird repelling devices each include an elongate insulating member fixedly carrying a pair of electrically conductive rods on opposite sides thereof. The conductive rods are substantially the same length as the elongate insulating member. A plurality of mounting fixtures removably mount the bird repelling devices to the vineyard poles. Each mounting fixture includes structure for removably holding a bird repelling device in place and for automatically making separate electrical connections with both conductive rods carried thereby. The mounting fixtures are fixedly secured to vineyard poles.

BRIEF DESCRIPTION OF THE DRAWINGS

FIG. 1 is a front elevation illustrating the bird repelling system of the present invention;

FIG. 2 is a front elevation of a bird repelling device used in the system of the present invention;

FIG. 3 is a front elevation similar to FIG. 2 showing the bird repelling device of FIG. 2 secured to a trellis wire of a vineyard;

FIG. 4 is a cross-sectional view taken along line 4—4 of FIG. 3;

FIG. 5 is a schematic, with parts exaggerated for emphasis and other parts removed for clarity, illustrating one possible placement of the bird repelling devices of FIG. 2;

Similar reference characters indicate similar parts throughout the several views of the drawings.

DESCRIPTION OF THE PREFERRED EMBODIMENT

Figure 6:
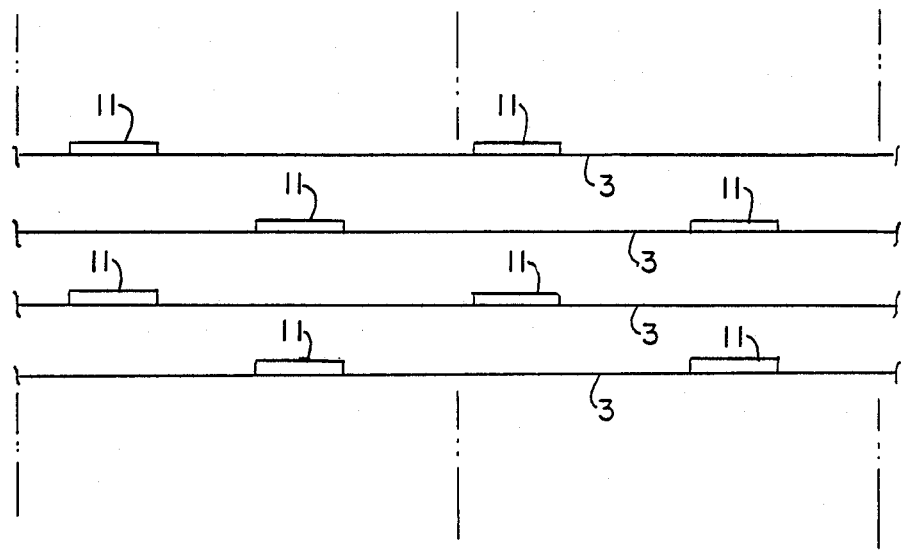
FIG. 6 is a schematic, with parts exaggerated for emphasis, illustrating the placement of the bird repelling devices of FIG. 2 throughout the vineyard.
Figure 7:
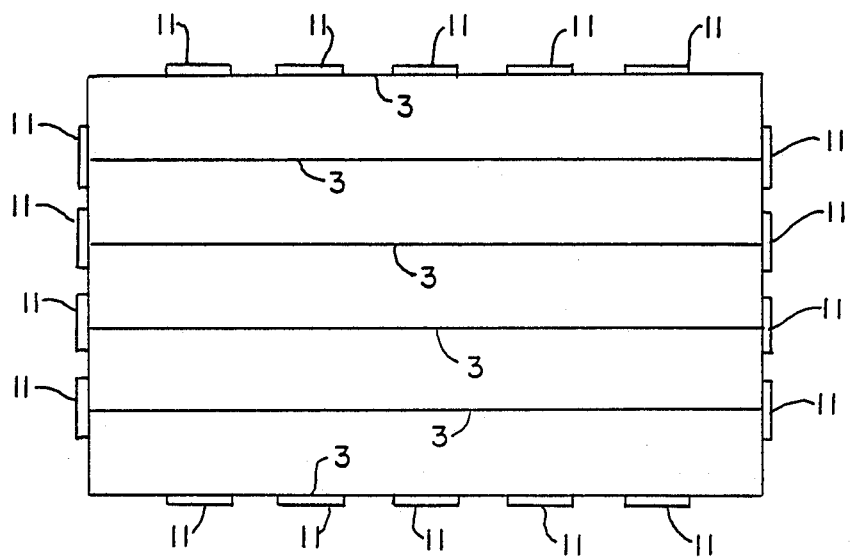
FIG. 7 is a schematic similar to FIG. 6, but on a smaller scale, illustrating another possible placement of the bird repelling devices of FIG. 2.

A system 1 of the present invention is designed for repelling birds from a vineyard such as the vineyards illustrated in various forms in FIGS. 1, 6, and 7. It is especially adapted for a conventional vineyard (see FIG. 1) having trellis wires 3 and 5 in each row of the vineyard stretched generally horizontally between a number of poles 7.

The trellis wires support the grape vines in the conventional manner and are made of a conventional weather resistant material such as galvanized steel. The trellis wires are unique only in the fact that with the bird repelling system of the present invention, the trellis wires are grounded. This is accomplished by means of a grounding rod 9 (FIG. 5) electrically connected to the trellis wires, which grounding rod is firmly planted in the earth. It is preferred that each row of the vineyard have its own grounding rod.

A number of identical bird repelling devices 11 (see especially FIGS. 2 and 3) are secured to the grounded trellis wires throughout the vineyard. Typically, the bird repelling devices are widely spaced, at a rate of about twenty-five or so per acre of vineyard. The devices include an elongate insulating member 13 which, as can be seen from FIG. 1, is much shorter than the distance between adjacent posts 7. That is, no attempt is made to cover the space between the adjacent posts with bird repelling devices. The size of the bird repelling device is selected to provide birds a convenient perch which the feet of the bird will encircle. For example, a bird repelling device having a circumference less than approximately one and one-half inch and a length of approximately three feet has been found to work very well. As shown in FIG. 1, it is preferred that the bird repelling device be attached to the trellis wire adjacent to the grape vine to provide the bird an attractive perch for eating grapes.

Each elongate insulating member 13 has an electrically conductive rod 15 secured thereto along its length. The rod is substantially as long as the elongate insulating member and terminates in an alligator clip 17 or some other suitable device for making electrical connection. As shown in FIGS. 2 and 3, the conductive rod is attached to the elongate insulative member by means of a weather resistant tape 19, although other means of attachment could also be used. As illustrated in FIGS. 3 and 4, tape 19 is also used to secure bird repelling device 11 to the trellis wire.

Also shown in FIG. 4 is the fact that the electrically conductive rod is not recessed into the insulative member but rather protrudes from the surface of its associated elongate insulating member. This maximizes the opportunity for a bird to make contact with the electrically conductive rod.

The elongate insulating members are designed to be weather resistant as well. Nylon and fiberglass are excellent materials for elongate insulating member 13. Similarly, conductive rod 15 must be weather resistant. It is preferably a stiff, galvanized steel rod approximately ¼" in circumference. Because rod 15 rests on the surface of the insulating member and is only held in place by tape, it is important that it be relatively stiff so that it will not shift out of position and contact the grounded trellis wire.

A conventional power source HV, such as those used for electrified fences on cattle farms, supplies high voltage (10,000 volts or so), low current power. The current is chosen low enough so as not to present any hazard to the birds, but merely to frighten them. This power is transmitted over a conventional, insulated wire such as dynamite blasting wire 21 to the various bird repelling devices 11. More specifically, the insulated wire is strung from the high voltage source to each of the bird repelling devices in series, as shown in FIG. 5. The alligator clip of each bird repelling device is then used to bite through the insulation on the insulated wire from the high voltage source to put that particular conductive rod 15 at the high voltage. In this manner, a large number of bird repelling devices can rapidly be connected to the high voltage source.

With this construction, when a bird lands on one of the bird repelling device to start eating grapes, its feet complete a circuit between the grounded trellis wire and the high voltage, electrically conductive rod. This shocks the bird without substantially harming it so that the bird flies away. It has been found that after one, or at most a few, shocks the birds avoid the entire vineyard protected by the bird repelling devices.

It is preferred that the various elements of the present bird repelling system resemble items the birds would expect to find in a vineyard. For example, the bird repelling devices can have a brownish color to look like wood, or a greenish or yellowish color to more closely resemble new growth on the grape vine. The insulated wire can also have a greenish or yellowish color so as to resemble a grape vine as well. This minimizes the possibility that the birds will be able to distinguish between the bird repelling devices and the natural grape vines.

As is illustrated most clearly in FIG. 5, the insulated wire 21 from the high voltage source runs generally parallel to the trellis wires so as to not interfere with the path between adjacent rows of the vineyard. One desirable configuration of bird repelling devices 11 is shown in that Figure. The devices are separated from each other (a preferred spacing is fifty feet) and are secured alternately to trellis wires 3 and 5. For clarity the vineyard poles and the vines have been removed in FIG. 5.

A portion of a typical vineyard is shown in FIG. 6, looking down on the vineyard from the air. The trellis wires are arranged in parallel rows, and the electrically conductive rods of one row are offset at least several feet from the electrically conductive rods of adjacent rows. Other arrangements are, of course, possible.

One such alternative arrangement of the bird repelling units is shown in FIG. 7. This arrangement is particularly well suited for vineyards which are situated well away from woods. Birds tend to start at the edge of a vineyard and work inwardly, so the bird repelling system illustrated in FIG. 7 has the bird repelling devices disposed solely around the periphery of the vineyard.

Figure 8:
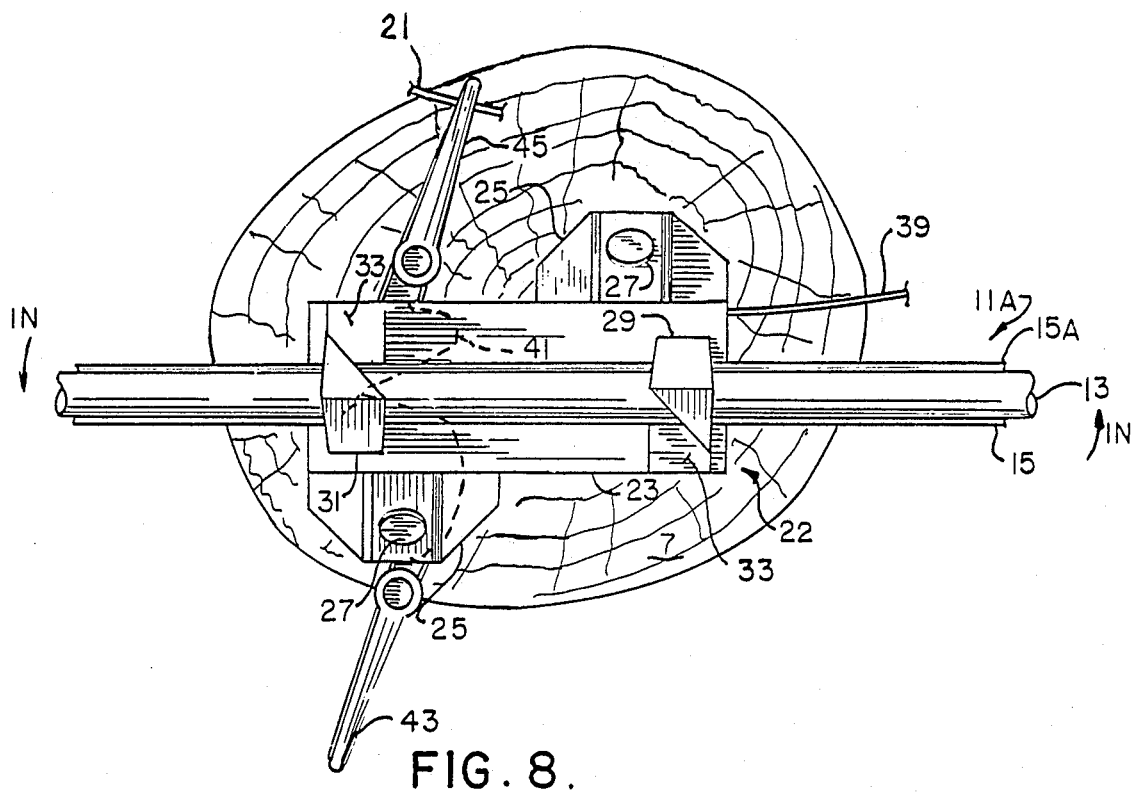
FIG. 8 is a top plan showing a mounting fixture particularly useful in the placement of bird repelling devices on the ends of vineyard rows.

In FIG. 7, the bird repelling devices at the ends of the rows are shown oriented perpendicularly to the trellis wires of that row. These bird repelling devices, labelled 11A in FIG. 8, are modifications of the devices 11 shown in FIGS. 1-6. As shown in FIG. 8, bird repelling devices 11A are mounted to the tops of the respective vineyard poles 7, instead of to the trellis wires. Elongate insulating member 13 in this modification carries not only conducive rod 15, but also a second conductive rod 15A. Conductive rod 15 still functions to carry the high voltage, while rod 15A provides the ground potential.

More particularly, bird repelling device 11A is fixedly yet removably secured to the top of pole 7 by a mounting fixture 22. Fixture 22 is made of a suitable weather-resistant material such as nylon or fiberglass. The fixture has a generally rectangular base 23 (although the shape of the base has no bearing on the present invention) from which outwardly extend two tabs 25. The tabs each have a hole therethrough suitably sized so that the mounting fixture may be fixedly secured to pole 7 by a pair of nails 27.

Figure 9:
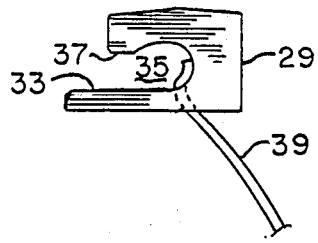
FIG. 9 is a side elevation of a portion of the mounting fixture of FIG. 8, with parts removed for clarity.

Extending upwardly from base 23 are a pair of identical holders 29 and 31, which are preferably integrally formed with the base. Holder 29 is shown in FIG. 9 with base 23 removed for clarity. Each holder includes an upwardly and rearwardly extending ramp 33 which terminates in a semi-circular opening or recess 35. The recess is shaped to receive bird repelling device 11A and hold it securely in place. To this end the top portion of each holder has a lip 37 which is disposed above ramp 33 a distance which is somewhat smaller than the diameter of bird repelling device 11A. The holder is made of a somewhat resilient material, so that as device IIA is moved up ramp 33, it forces lip 37 away from ramp 33. Once device IIA clears lip 37 and enters recess 35, the lip snaps back into place, thereby confining device IIA in the recess. Of course, removal of device 11A from the holder is accomplished by reversing that action.

Holders 29 and 31 are disposed as shown in FIG. 8 with the ramps 33 facing each other. Rotational movement of bird repelling device 11A in the direction indicated by the pair of arrows labelled IN causes the device to snap into both holders generally at the same time.

Figure 10:
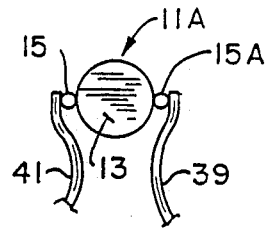
FIG. 10 is a schematic illustrating the electrical connections made by the mounting fixture of FIG. 8.

Disposed in the back of each recess is an exposed conductive wire. The wire for holder 29 is labelled 39, and the wire for holder 31 is labelled 41. When the bird repelling device is snapped into the two holders, electrical contact is automatically made between wire 39 and the grounding rod 15A, on the one hand, and wire 41 and the high voltage rod 15, on the other, as shown in FIG. 10. Wire 39 is simply attached to ground in any convenient manner.

Wire 41 is used to complete the high voltage side of the circuit. It is electrically connected to a pair of alligator clips 43, 45 disposed on opposite sides of the mounting fixture. With this configuration, rapid and convenient connection may be made to high voltage wire 21 on either side of the vineyard pole 7 as desired.

It should be appreciated that mounting fixture 22 provides an extremely flexible, rapid, and convenient way to removably mount bird repelling device IIA to the top of pole 7.

In view of the above it will be seen that the various objects and features of the present invention are achieved and other advantageous results obtained.

As various changes could be made in the above systems without departing from the scope of the invention, it is intended that all matter contained in the above description or shown in the accompanying drawings shall be interpreted as illustrative and not in a limiting sense.

What is claimed is:

1. A system for repelling birds from a vineyard or the like, said vineyard having trellis wires stretched generally horizontally between a plurality of poles for the grape vines to grow along, said bird repelling system comprising:
   means for grounding at least some of the trellis wires;
   a plurality of elongate insulating members, each having a length much shorter than the distance between adjacent vineyard poles, the length being sufficient to allow a bird to land thereon, the elongate insulating member having a circumference less than approximately one and one-half inches to allow the feet of a bird landing thereon to cover most of the circumference of the elongate insulating member;

for each elongate insulating member, an electrically conductive rod secured to its corresponding elongate insulating member along the length thereof, said rod being substantially as long as the elongate insulating member;

means for applying a high voltage to each electrically conductive rod;

each of said plurality of elongate insulating members being adapted to be secured to selected portions of the trellis wires parallel to said trellis wires so that a bird landing on an elongate insulating member completes a circuit between the trellis wire and the electrically conductive rod carried by that elongate insulating member to shock the bird without substantially harming it so that the bird flies away.

2. The bird repelling system as set forth in claim 1 wherein the elongate insulating members are composed of a plastic insulative material with good weather-resistant characteristics.

3. The bird repelling system as set forth in claim 2 wherein the elongate insulating members are composed of a material selected from the group consisting of nylon and fiberglass.

4. The bird repelling system as set forth in claim 1 wherein the electrically conductive rods are composed of a material with good weather-resistant characteristics.

5. The bird repelling system as set forth in claim 1 wherein the high voltage applying means includes an alligator clip for each electrically conductive rod, said clip being secured to its associated rod, and an insulated wire running from a source of high voltage to at least a plurality of the electrically conductive rods, electrical connection between the electrically conductive rods and the insulated wire being made by the alligator clips.

6. The bird repelling system as set forth in claim 1 wherein the high voltage applying means includes an insulated wire connected to a high voltage source and running generally parallel to the trellis wires and means associated with each electrically conductive rod for making electrical connection between the high voltage source and the respective electrically conductive rod.

7. The bird repelling system as set forth in claim 1 wherein adjacent electrically conductive rods are spaced a substantial distance apart in the vineyard.

8. The bird repelling system as set forth in claim 7 wherein adjacent electrically conductive rods are spaced on the order of fifty feet apart.

9. The bird repelling system as set forth in claim 1 wherein each elongate insulating member is generally circular in cross section and each electrically conductive rod is disposed above and protruding from the surface of its associated elongate insulating member to maximize the opportunity for a bird to make contact with said rod.

10. The bird repelling system as set forth in claim 9 further including, for each electrically conductive rod, means for securing the rod to its associated elongate insulating member and wherein each electrically conductive rod is relatively stiff and is held out of contact with the grounded trellis wire by the securing means for that rod.

11. The bird repelling system as set forth in claim 1 wherein the trellis wires are arranged in parallel rows, the electrically conductive rods of one row being offset at least several feet from the electrically conductive rods of adjacent rows.

12. The bird repelling system as set forth in claim 1 wherein the high voltage applying means includes an insulated wire carrying high voltage from a high voltage source to the electrically conductive rods, said insulated wire being colored so as to resemble a grape vine.

13. The bird repelling system as set forth in claim 1 wherein the trellis wires are arranged in parallel rows, there being a grounding rod for each row serving as the grounding means for the trellis wires of that row.

14. The bird repelling system as set forth in claim 1 wherein the electrically conductive rods are disposed solely around the periphery of the vineyard.

15. A system for repelling birds from a vineyard or the like, said vineyard having trellis wires stretched generally horizontally between a plurality of poles for the grape vines to grow along, said bird repelling system comprising:

means for grounding at least some of the trellis wires;

a first set of elongate insulating members, each having a length much shorter than the distance between adjacent vineyard poles, the length being sufficient to allow a bird to land thereon, the elongate insulating member having a circumference less than approximately one and one-half inches to allow the feet of a bird landing thereon to cover most of the circumference of the elongate insulating member;

for each elongate insulating member of the first set, an electrically conductive rod secured to its corresponding elongate insulating member along the length thereof, said rod being substantially as long as the elongate insulating member;

means for applying a high voltage to each electrically conductive rod;

each of said elongate insulating members of the first set being adapted to be secured to selected portions of the trellis wires parallel to said trellis wires so that a bird landing on an elongate insulating member completes a circuit between the trellis wire and the electrically conductive rod carried by that elongate insulating member to shock the bird without substantially harming it so that the bird flies away;

a second set of elongate insulating members, each member of the second set fixedly carrying a pair of electrically conductive rods on opposite sides thereof; and a plurality of mounting fixtures fixedly secured to predetermined vineyard poles, each fixture having means for removably holding an elongate member of the second set in place and for automatically making electrical connection with both conductive rods carried by said member.

16. The bird repelling system as set forth in claim 15 wherein the mounting fixtures are composed of a plastic insulative material with good weather-resistant characteristics.

17. In a system for repelling birds from a vineyard, said vineyard having a plurality of poles for supporting grape vines at least indirectly, a plurality of bird repelling devices for mounting to selected vineyard poles, said bird repelling devices each including an elongate insulating member fixedly carrying a pair of electrically conductive rods on opposite sides thereof, the conductive rods being substantially the same length as the elongate insulating member, and a plurality of mounting fixtures for removably mounting the bird repelling devices to the vineyard poles, each mounting fixture including means for removably holding a bird repelling device in place and for automatically making separate electrical connections with both conductive rods carried thereby upon rotational insertion of the bird repelling device, and means for fixedly securing the mounting fixture to a vineyard pole.

18. The system as set forth in claim 17 wherein each mounting fixture includes a pair of holders for holding a bird repelling device, said holders each having an opening on one side thereof to accept the bird repelling device, said openings of the holders facing each other so that a single rotational movement of the bird repelling device moves the device into both openings.

19. The system as set forth in claim 18 wherein each holder includes an inwardly and upwardly extending ramp along the bottom of its respective opening to guide the bird repelling device into the opening of that holder.

20. The system as set forth in claim 19 further including an overhanging lip disposed above the ramp of each holder to hold the bird repelling device in place once it enters the opening.

21. The system as set forth in claim 17 wherein the electrical connection to one of the conductive rods terminates in an alligator clip for connection to a high voltage wire.

* * * * *